(12) United States Patent
Feistel

(10) Patent No.: US 10,077,842 B2
(45) Date of Patent: Sep. 18, 2018

(54) SEALING RING

(71) Applicant: Burckhardt Compression AG, Winterthur (CH)

(72) Inventor: Norbert Feistel, Ellikon a.d. Thur (CH)

(73) Assignee: BURCKHARDT COMPRESSION AG., Winterthur (CH)

(*) Notice: Subject to any disclaimer, the term of this patent is extended or adjusted under 35 U.S.C. 154(b) by 0 days.

(21) Appl. No.: 15/107,123

(22) PCT Filed: Dec. 15, 2014

(86) PCT No.: PCT/EP2014/077780
§ 371 (c)(1),
(2) Date: Jun. 22, 2016

(87) PCT Pub. No.: WO2015/097014
PCT Pub. Date: Jul. 2, 2015

(65) Prior Publication Data
US 2017/0002928 A1 Jan. 5, 2017

(30) Foreign Application Priority Data

Dec. 23, 2013 (EP) .................................... 13199268

(51) Int. Cl.
*F16J 15/00* (2006.01)
*F16J 15/3268* (2016.01)
(Continued)

(52) U.S. Cl.
CPC .......... *F16J 15/3268* (2013.01); *F16J 15/24* (2013.01); *F16J 15/26* (2013.01); *F16J 7/00* (2013.01)

(58) Field of Classification Search
CPC .. F16J 15/3268; F16J 7/00; F16J 15/24; F16J 15/26
(Continued)

(56) References Cited

U.S. PATENT DOCUMENTS 1,548,978 A * 8/1925 Bush .................. F16J 9/063
277/482
1,782,258 A 11/1930 Dunham
(Continued)

FOREIGN PATENT DOCUMENTS

AT 505550 A4 2/2009
EP 2060833 A1 5/2009
(Continued)

OTHER PUBLICATIONS

International Application PCT/EP2014/077780, Search Report dated Feb. 11, 2015 (4 pages) and translation thereof (3 pages).
(Continued)

*Primary Examiner* — Nathan Cumar
(74) *Attorney, Agent, or Firm* — Vladimir Sherman; Professional Patent Solutions Ltd.

(57) ABSTRACT

The invention relates to a sealing ring (1) for sealing a piston rod comprising a retaining ring (2) having a circular inside diameter (M1) and a center axis (M) and comprising a plurality of sealing segments (3), which are supported in the retaining ring (2) in such a way that the sealing segments can be moved in a direction radial to the center axis (M), wherein each sealing segment (3) has a sealing surface (3a) that is oriented toward the center axis (M) and that extends in a curved manner in a circumferential direction (U) with respect to the center axis (M), and wherein each sealing segment (3) has two lateral sealing-segment guiding surfaces (3b) extending parallel to each other, wherein the sealing surface (3a) ends at one of the two sealing-segment guiding surfaces (3b) at both ends, and wherein the retaining ring (2) comprises a plurality of guiding segments (2a) arranged at a distance from each other in the circumferential direction (U), wherein each two guiding segments (2a) following each other in the circumferential direction (U) have guiding surfaces (2b, 2c) that face each other and that
(Continued)

extend parallel to each other, said guiding surfaces being arranged at a distance from each other in such a way and being designed in such a way that, by means of the sealing-segment guiding surfaces (3b) of the sealing segment, the sealing segment (3) is guided on the two lateral guiding surfaces (2b, 2c) and is supported on the two lateral guiding surfaces in such a way that the sealing segment can be moved in the radial direction (R), wherein guiding segments (2a) and sealing segments (3) are arranged in succession in the circumferential direction (U).

15 Claims, 7 Drawing Sheets

(51) Int. Cl.
  *F16J 15/24* (2006.01)
  *F16J 15/26* (2006.01)
  *F16J 7/00* (2006.01)
(58) Field of Classification Search
  USPC ................................ 277/543, 498, 489, 492
  See application file for complete search history.

(56) References Cited

U.S. PATENT DOCUMENTS

| | | | | |
|---|---|---|---|---|
| 1,809,407 | A | * | 6/1931 | Fox ........................ F16J 15/26 277/530 |
| 1,813,016 | A | | 7/1931 | Bentley |
| 1,819,559 | A | * | 8/1931 | Jones ...................... F16J 15/28 277/543 |
| 1,879,988 | A | * | 9/1932 | Morton ................... F16J 15/28 277/510 |
| 2004/0227301 | A1 | * | 11/2004 | Wood ...................... F16J 15/26 277/434 |

FOREIGN PATENT DOCUMENTS

| | | |
|---|---|---|
| EP | 2 479 460 A1 | 7/2012 |
| GB | 163200 A | 5/1921 |
| JP | S56 101462 A | 8/1981 |

OTHER PUBLICATIONS

International Application PCT/EP2014/077780, Written Opinion dated Feb. 11, 2015 (6 pages).

* cited by examiner

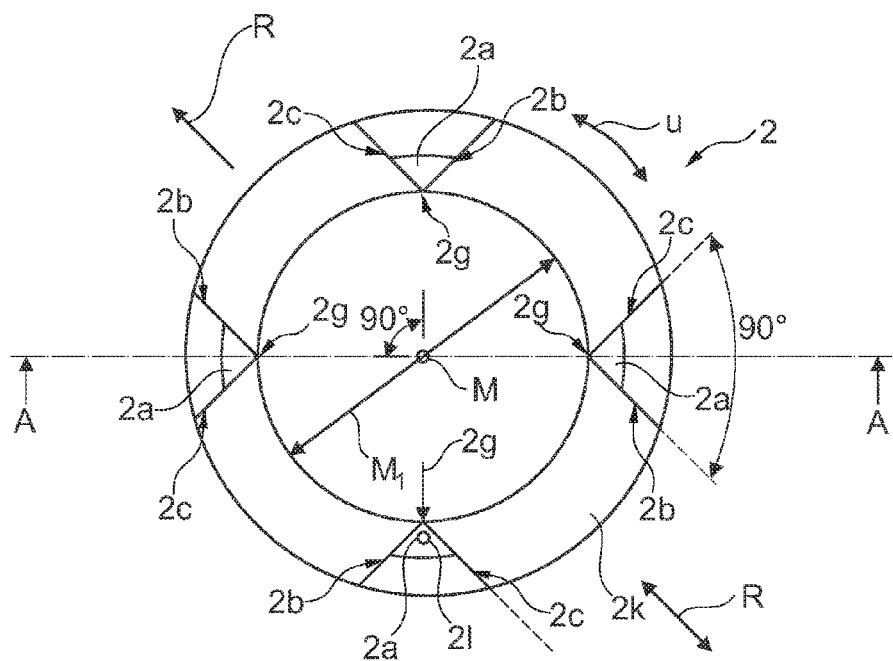
Fig. 3
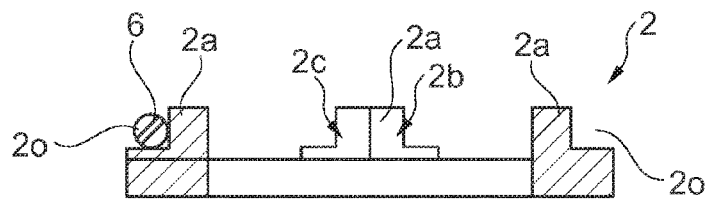
Fig. 4 (A - A)
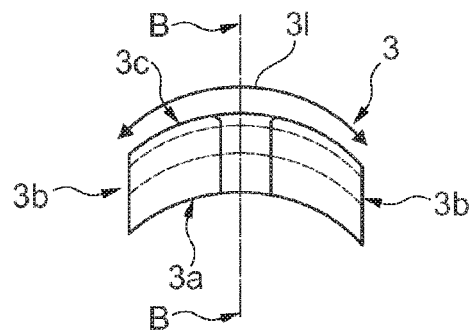
Fig. 5

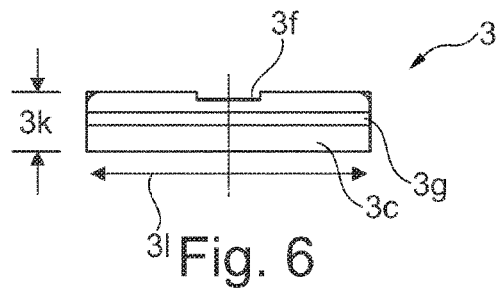
Fig. 6
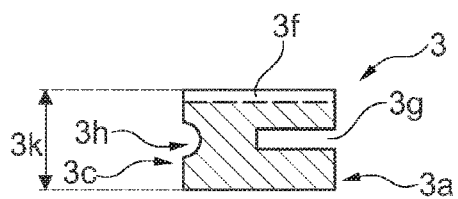
Fig. 7 (B - B)
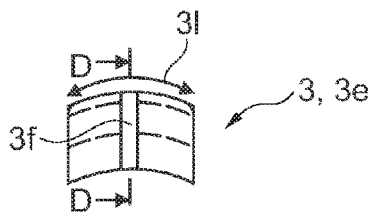
Fig. 8
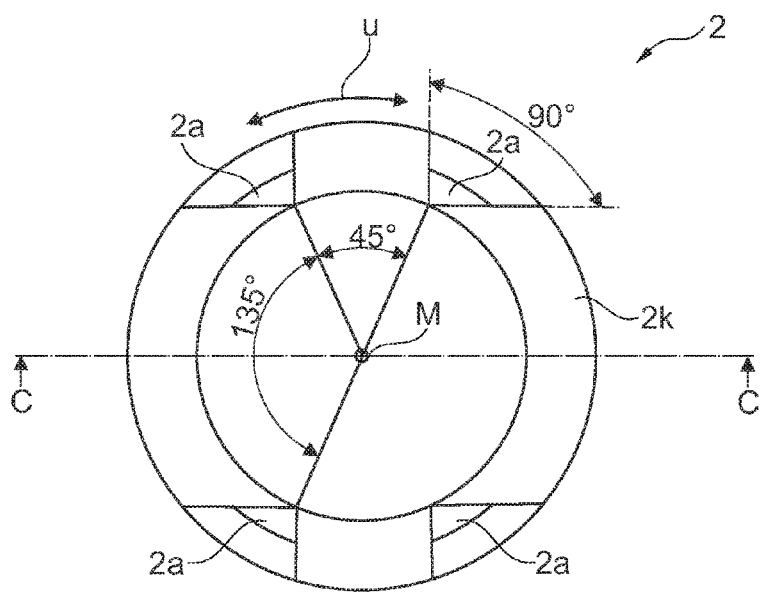
Fig. 9

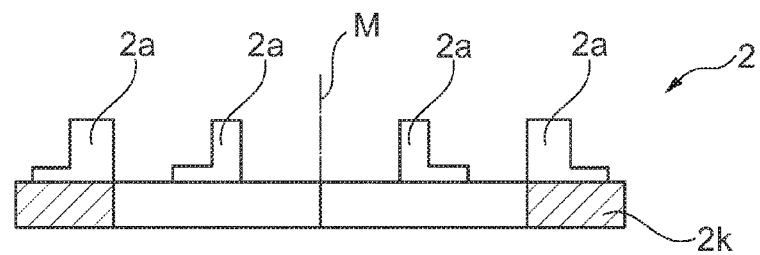
Fig. 10 (C - C)
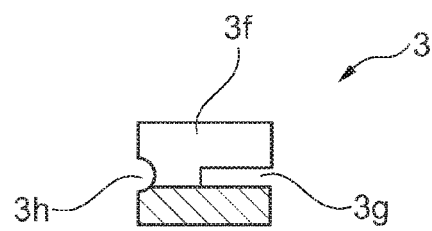
Fig. 11 (D - D)
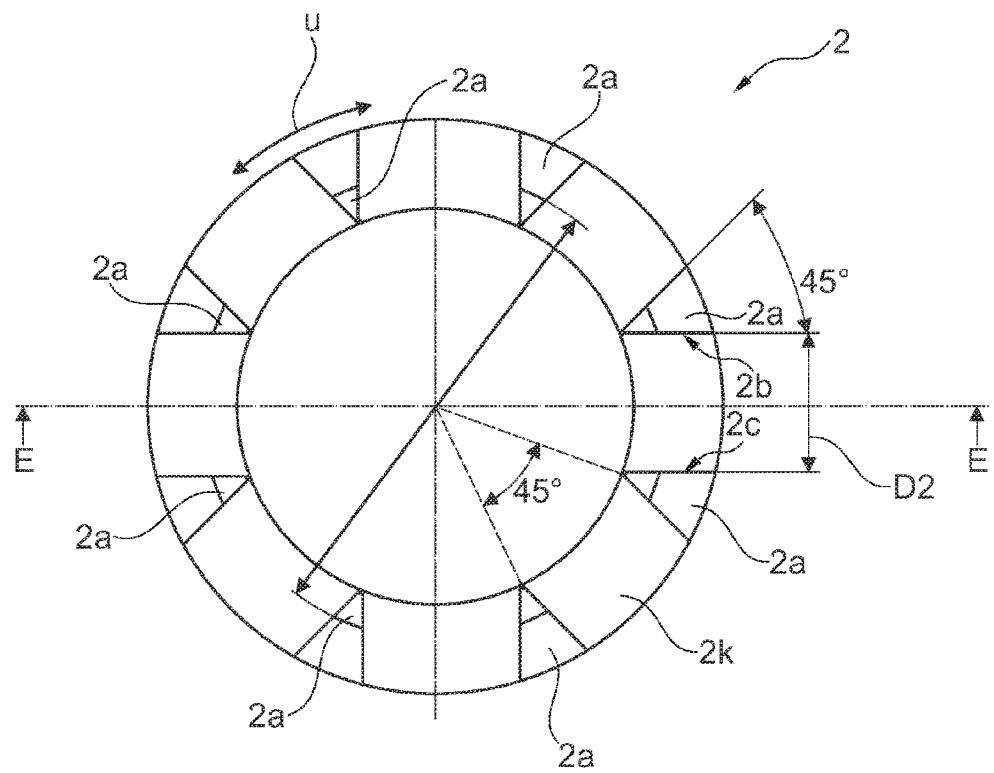
Fig. 12

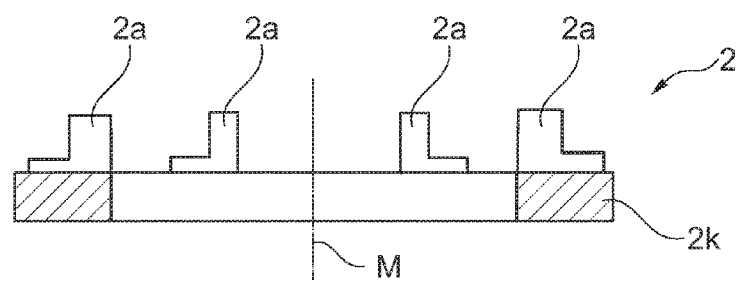
Fig. 13 (E - E)
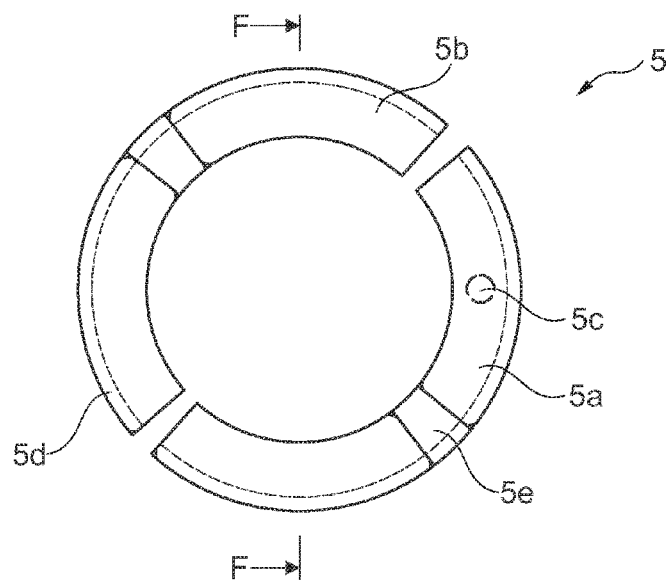
Fig. 14
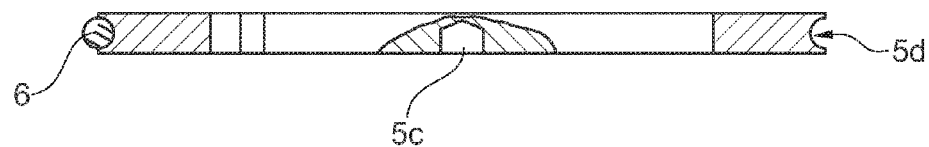
Fig. 15 (F - F)

SEALING RING

The invention relates to a sealing ring according to the preamble of claim 1.

PRIOR ART

Document EP 2060833 A1 discloses a packing ring combination for sealing off a piston rod, wherein the packing ring combination comprises a sealing ring and a stop ring. This packing ring combination has the disadvantage that the sealing segments are subject to a wear stop after a certain degree of wear so that a gap is formed between the sealing segment and the piston rod which has the result that the sealing action is significantly reduced. This known packing ring combination thus has the disadvantage that the sealing action is significantly reduced after a certain degree of wear.

EXPLANATION OF THE INVENTION

The object of the invention is to form a commercially more advantageous sealing ring for sealing off piston rods.

This object is achieved with a sealing ring having the features of claim 1. Claims 2 to 14 relate to further, advantageously configured sealing rings. This object is achieved in particular with a sealing ring comprising a holding ring having a circular inner diameter and a central axis, and comprising a multiplicity of sealing segments which are mounted in the holding ring so as to be displaceable in a radial direction relative to the central axis, wherein each sealing segment has a sealing surface which is aligned towards the central axis and runs in a curved manner in the circumferential direction to the central axis, and wherein each sealing segment has two lateral sealing segment guide surfaces running mutually parallel, wherein the sealing surface ends on both sides at in each case one of the two sealing segment guide surfaces, and wherein the holding ring comprises a multiplicity of guide segments arranged mutually spaced apart in the circumferential direction, wherein in each case two guide segments which follow consecutively in the circumferential direction have guide surfaces which face one another and run parallel and which are arranged mutually spaced apart and configured in such a manner that the sealing segment is guided via its sealing segment guide surfaces on the two lateral guide surfaces and is mounted displaceably in the radial direction, wherein guide segments and sealing segments are arranged following consecutively in the circumferential direction. The holding ring is configured integrally and extends along a circumferential angle of 360°.

The sealing ring according to the invention has the advantage that its sealing action does not change even with progressing wear. In contrast to this, the sealing action in the case of the sealing ring known from the prior art changes in principle from a certain degree of wear in that the sealing ring known from the prior art forms a friction-free gap seal from a certain degree of wear which results in a corresponding increase in leakage. In the case of the sealing ring according to the invention, its leakage cross section and thus also its sealing action do not change even in the case of progressing wear and during the entire wear path. The sealing ring according to the invention thus ensures a reliable seal which acts in a uniform manner in the long term, which on the one hand ensures a reliable sealing action and which on the other hand reduces maintenance costs.

In one particularly advantageous configuration, four sealing segments are arranged mutually spaced apart in the circumferential direction and mounted displaceably in the holding ring in the direction of the central axis. In a further possible configuration, the sealing ring according to the invention comprises at least five sealing segments, preferably six or eight sealing segments.

In one advantageous configuration, all the sealing segments have the same width in the circumferential direction.

In a further possible embodiment, at least two sealing segments arranged following consecutively in the circumferential direction have a mutual offset in the axial direction or in the direction of the central axis, in which offset the sealing segments are arranged mutually displaced in the axial direction. This offset is preferably of equal size to or larger than the height of the sealing segment in the axial direction, as a result of which it is possible that two sealing segments arranged following consecutively in the circumferential direction are configured to be of such width that they mutually overlap in the circumferential direction.

In a further advantageous configuration, at least one sealing segment and preferably all sealing segments are connected to an actuator, for example to a piezoelectric actuator, in order to actuate the position of the sealing segments in a radial direction to the central axis. In one advantageous configuration, a sensor is furthermore provided which makes it possible to determine the position of the face side, which is aligned towards the piston rod, of the sealing segment in order to determine, for example, the gap width between the surface of the piston rod and the face side of the sealing segment. In one advantageous embodiment, an open- and closed-loop control device is provided which makes it possible to actuate the position of the sealing segments with the aid of values measured by the sensor and with the aid of the actuators in such a manner that the sealing segments occupy a previously determined position so that the face side of a respective sealing segment have, for example, a predefined distance to the surface of the piston rod so that the gap width between piston rod and sealing segment can be adjusted and regulated. Such an embodiment has, for example, the advantage that the sealing segments have an extremely low degree of wear since the face side of the sealing segment does not touch the piston rod or only touches it to a small degree so that this results in no or only a small degree of wear of the face side of the sealing segment.

BRIEF DESCRIPTION OF THE DRAWINGS

In the drawings used to explain the exemplary embodiments:

FIG. 3 shows a top view of a second exemplary embodiment of a sealing ring;

FIG. 4 shows a section through FIG. 3 along line A-A;

FIG. 5 shows a top view of a sealing segment;

FIG. 6 shows a side view of the sealing segment according to FIG. 5;

FIG. 7 shows a section through the sealing segment according to FIG. 5 along line B-B;

FIG. 8 shows a top view of a further sealing segment;

FIG. 9 shows a top view of a third exemplary embodiment of a sealing ring;

FIG. 10 shows a section through FIG. 9 along line C-C;

FIG. 11 shows a section through FIG. 8 along line D-D;

FIG. 12 shows a top view of a fourth exemplary embodiment of a sealing ring;

FIG. 13 shows a section through FIG. 12 along line E-B;

FIG. 14 shows a top view of a covering ring;

FIG. 15 shows a section through the covering ring according to FIG. 14 along line F-F;

Identical parts in the drawings are in principle provided with identical reference numbers.

WAYS TO CARRY OUT THE INVENTION

Figure 1:
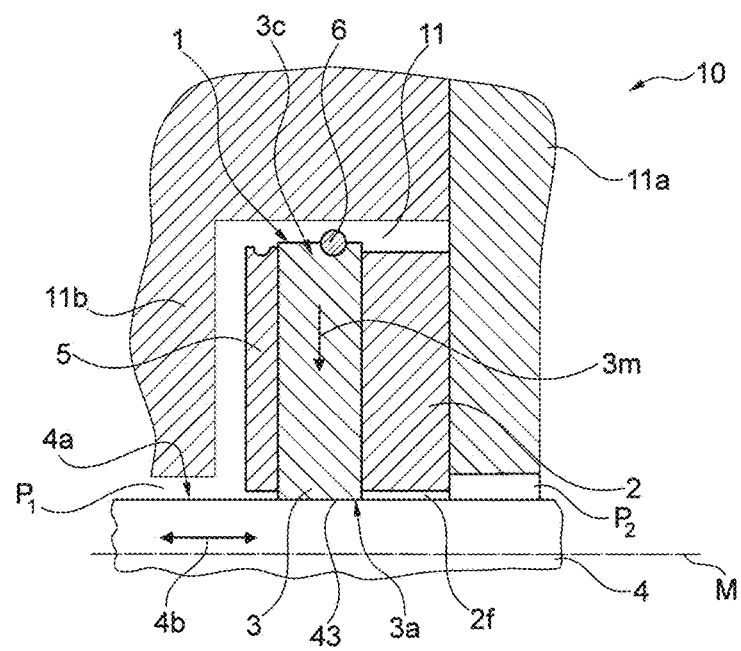
FIG. 1 shows a longitudinal section through a seal arrangement.
Figure 2:
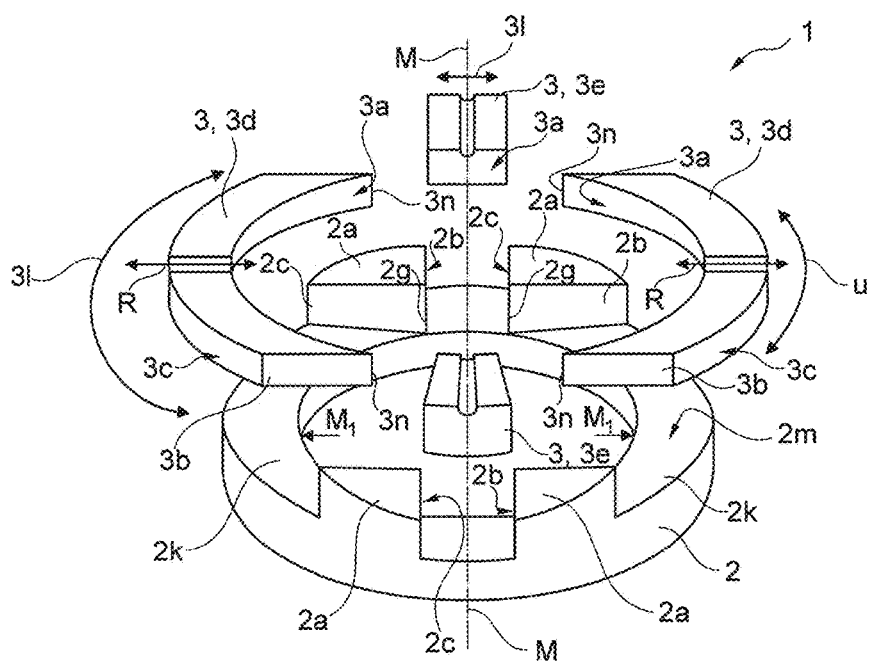
FIG. 2 shows a first exemplary embodiment of a sealing ring.

FIG. 1 shows a longitudinal section through a seal arrangement 10 for sealing off a piston rod 4, which oscillates in axial direction 4b, of a piston compressor. Seal arrangement 10 preferably comprises a multiplicity of packing chambers 11 arranged following consecutively in axial direction 4b with in each case a first and a second side wall 11a, 11b, wherein a sealing ring 1 is arranged in each packing chamber 11. The gas pressure in packing chamber 11 is reduced via sealing ring 1 from higher pressure P1 to lower pressure P2. This pressure reduction is carried out in particular above sealing gap 43 formed between face side 3a of sealing segment 3 and surface 4a of piston rod 4. Sealing ring 1 according to the invention comprises, as represented in FIG. 2 in an exemplary embodiment, a holding ring 2 extending over 360° and having a circular inner diameter M1 and a central axis M, and comprises a multiplicity of sealing segments 3 mounted displaceably in the radial direction towards central axis M in holding ring 2. Holding ring 2 is configured integrally and extends without a joint along a circumferential angle of 360°. As is apparent from FIG. 1, inner diameter M1 is configured to be larger than the outer diameter of piston rod 4 so that a gap 2f is formed between holding ring 2 and piston rod 4. As a result of higher pressure P1 which is present at sealing segment outer side 3c, sealing segment 3 mounted displaceably in the direction of central axis M is pushed via its face side 3a with a contact force 3m onto surface 4a of piston rod 4. The movement of piston rod 4 brings about wear of sealing segment 3 on face side 3a. The active contact force 3m and the property of sealing segment 3 of being mounted displaceably towards central axis M have the result that sealing gap 43 remains reliably sealed off, where necessary until almost the whole of sealing segment 3 is perished. Seal ring 3 according to the invention therefore has a constant sealing action which is reliable in the long term, where necessary until the whole of sealing segment 3 is perished. Sealing segment 3 has the advantage that no uneven or only minimally uneven material removal takes place on face side 3a in its circumferential direction U so that the leakage cross section of sealing gap 43 and thus the sealing action of sealing gap 43 does not change or only changes to an unnoticeably small extent over the entire wear path of sealing segment 3. Sealing ring 1 furthermore has the advantage that sealing segment 3 does not deform elastically and/or plastically or only does so minimally, which in turn has the result that the leakage cross section of sealing gap 43 and thus the sealing action of sealing gap 43 does not change or only changes to an unnoticeably small extent over the entire wear path of sealing segment 3. Sealing ring 1 according to the invention thus has a reliable sealing action in the long term.

In particular for mounting of sealing ring 1, it can be advantageous if a spring such as a tube spring 6 is provided which encloses all sealing segments 3 in circumferential direction U.

FIG. 1 also shows an optimum covering ring 5 which serves to improve the sealing action of sealing ring 1. Covering ring 5 can, however, also be omitted.

Different embodiments of sealing rings 1 are disclosed below.

Sealing ring 1 represented in FIG. 2 for sealing off a piston rod 4 comprises a holding ring 2 having a circular inner diameter M1 and a central axis M, and comprises four sealing segments 3 which are mounted in holding ring 2 so as to be displaceable in a radial direction R relative to central axis M, wherein each sealing segment 3 has a sealing surface 3a which is aligned towards central axis M and runs in a curved manner in circumferential direction U to central axis M and adjusted to the surface of piston rod 4. Each sealing segment 3 has two lateral sealing segment guide surfaces 3b running mutually parallel, wherein sealing surface 3a ends on both sides at in each case one of two sealing segment guide surfaces 3b. Holding ring 2 comprises a base ring 2k and a multiplicity of guide segments 2a arranged mutually spaced apart in circumferential direction U, wherein guide segments 2a protrude in the direction of central axis M over base ring 2k, wherein in each case two guide segments 2a which follow consecutively in circumferential direction U have guide surfaces 2b, 2c which face one another and run parallel and which are arranged mutually spaced apart and configured in such a manner that in each case a single sealing segment 3 is guided via its sealing segment guide surfaces 3b on the two lateral guide surfaces 2b, 2c and is mounted displaceably in radial direction R, wherein guide segments 2a and sealing segments 3 are arranged following consecutively in circumferential direction U.

Figure 18:
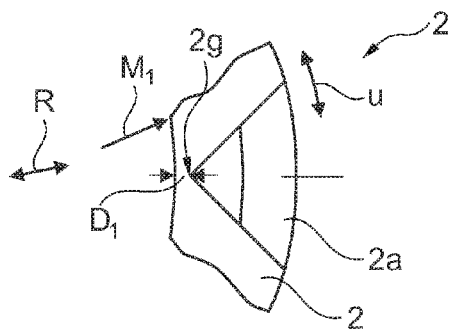
FIG. 18 shows a top view of a cutout of a guide ring.

Guide segments 2a end in a tip 2g in the direction of central axis M. In one advantageous configuration, tip 2g, as represented in FIG. 2, runs in the direction of central axis M flush with inner diameter M1. In a further possible configuration, tip 2g of guide segment 2a, as represented in FIG. 18, has a distance D1 or a spacing in radial direction R of up to 0.4 mm, preferably of up to 0.2 mm to inner diameter M1.

In one advantageous configuration, sealing ring 1 comprises, as represented in FIG. 2, four sealing segments 3 and four guide segments 2a, wherein lateral guide surfaces 2b, 2c of each guide segment 2a run at an angle of 90 degrees.

In one advantageous configuration, sealing ring 1, as represented in FIG. 2, has in each case two sealing segments 3 arranged lying opposite in relation to central axis M and having the same width 3l in circumferential direction U, wherein sealing segments 3 arranged following consecutively in circumferential direction U have different widths 3l in circumferential direction U. Sealing ring 1 represented in FIG. 2 thus has two narrow sealing segments 3e and two wide sealing segments 3d.

A further exemplary embodiment is represented in FIG. 3 in a top view and in FIG. 4 in a section along line A-A. Four guide segments 2a protruding in the direction of central axis M over base ring 2k are arranged along base ring 2k, wherein guide segments 2a following consecutively in circumferential direction U are arranged offset in each case by 90 degrees. Each guide segment 2a has two lateral guide surfaces 2b, 2c which open out at an angle of 90 degrees into tip 2g. Opposite guide surfaces 2b, 2c of two guide segments 2a following consecutively in circumferential direction U form two surfaces running parallel and between which in each case a sealing segment 3, as represented in FIG. 5, is mounted displaceably in radial direction R. Sealing segment 3 comprises two sealing segment guide surfaces 3b running parallel, a sealing surface 3a and a sealing segment outer side 3c. FIG. 6 shows a side view of sealing segment 3 and FIG. 7 shows a section along line B-B of sealing segment 3. Sealing segment 3 represented in FIGS. 5, 6 and 7 comprises a radially running connection duct 3f, a pressure-relief groove 3g and a recess 3h for a spring. Sealing segment 3 has an axial width 3k. All four sealing segments 3 used for holding ring 2 have the same width in circumferential direction U so that all sealing segments 3 are configured to be identical.

In one advantageous configuration, guide segment 2a, as represented in FIG. 4, has a recess 2o along which tube spring 6 represented in FIG. 1 can run which, in one possible embodiment, encloses sealing segments 3.

A further exemplary embodiment is represented in FIG. 9 in a top view and in FIG. 10 in a section along line C-C. Four guide segments 2a protruding in the direction of central axis M over base ring 2k are arranged along base ring 2k, wherein guide segments 2a following consecutively in circumferential direction U are arranged offset in each case by 45 degrees or by 135 degrees. Each guide segment 2a has two lateral guide surfaces 2b, 2c which open out at an angle of 90 degrees into tip 2g. Opposite guide surfaces 2b, 2c of two guide segments 2a following consecutively in circumferential direction U form two surfaces running parallel and between which in each case a wide sealing segment 3d or, as represented in FIG. 8, a narrow sealing segment 3e is arranged.

FIG. 7 shows a section along line B-B through sealing segment 3. Sealing segment 3 comprises a radially running connection duct 3f, a pressure-relief groove 3g and a recess 3h for a spring.

A further exemplary embodiment is represented in FIG. 12 in a top view and in FIG. 13 in a section along line E-E. Eight guide segments 2a protruding in the direction of central axis M over base ring 2k are arranged along base ring 2k, wherein guide segments 2a following consecutively in circumferential direction U are arranged offset in each case by 45 degrees. Each guide segment 2a has two lateral guide surfaces 2b, 2c which open out at an angle of 45 degrees into tip 2g. Opposite guide surfaces 2b, 2c of two guide segments 2a following consecutively in circumferential direction U form two surfaces which run parallel, are mutually spaced apart by a distance D2 and between which in each case a sealing segment 3 is arranged. In the case of holding ring 2 represented in FIG. 12, all sealing segments 3 are preferably configured identically.

Sealing ring 1 according to the invention comprises at least four sealing segments 3 arranged spaced apart in circumferential direction U, and advantageously four, six or eight sealing segments 3, and correspondingly four, six or eight guide segments 2a arranged in circumferential direction U between sealing segments 3. All sealing segments 3 advantageously have the same width 3l in circumferential direction U and all guide segments 2a have the same width in circumferential direction U. Sealing ring 1 could also comprise an odd number of at least five sealing segments 3 and comprise the same number of guide segments 2a which are arranged in circumferential direction U between sealing segments 3. The angle at which both lateral guide surfaces 2b, 2c of each guide segment 2a run is dependent on the total number of sealing segments 3 or the total number of guide segments 2a which corresponds to the total number of sealing segments 3. Depending on the total number, the angle is smaller than or equal to 90 degrees. In the case of four sealing segments 3 or guide segments 2a, the angle is 90 degrees. In the case of five sealing segments 3 or guide segments 2a, the angle is 72 degrees. In the case of six sealing segments 3 or guide segments 2a, the angle is 60 degrees or, in the case of eight sealing segments or guide segments, 45 degrees. The angle becomes correspondingly smaller with an increasing number of sealing segments 3 or guide segments 2a.

FIG. 14 shows in a top view and FIG. 15 in a section along sectional line F-F an exemplary embodiment of a covering ring 5. Covering ring 5 comprises a first and a second covering ring half 5a, 5b and also has a recess 5c for receiving a pin 2l as well as a recess 5d for receiving a tube spring 6. Holding ring 2 can, as represented in FIG. 3, have a pin 2l protruding in the direction of central axis M, wherein covering ring 5 is placed laterally on sealing ring 1 in such a manner that protruding pin 2l projects into recess 5c so that covering ring 5 assumes a defined position in relation to sealing ring 1.

Figure 16:
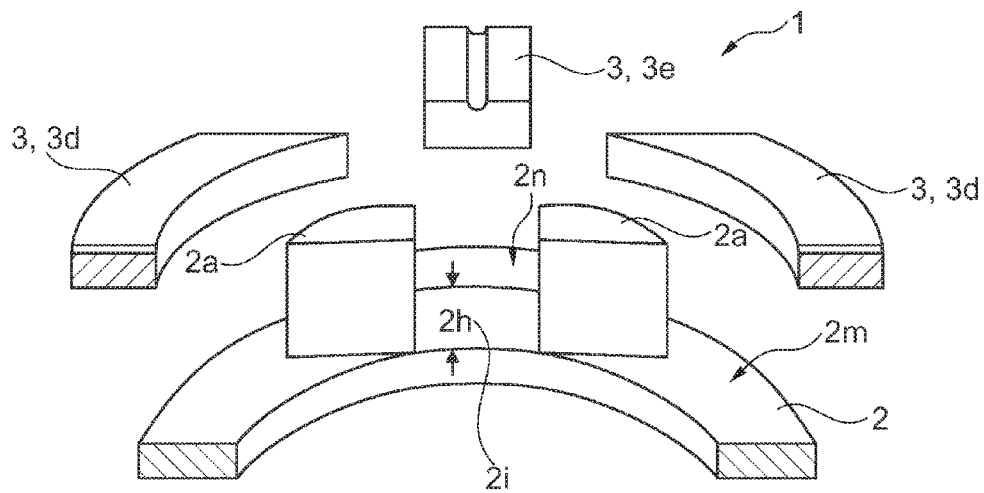
FIG. 16 shows a fifth exemplary embodiment of a sealing ring.
Figure 17:
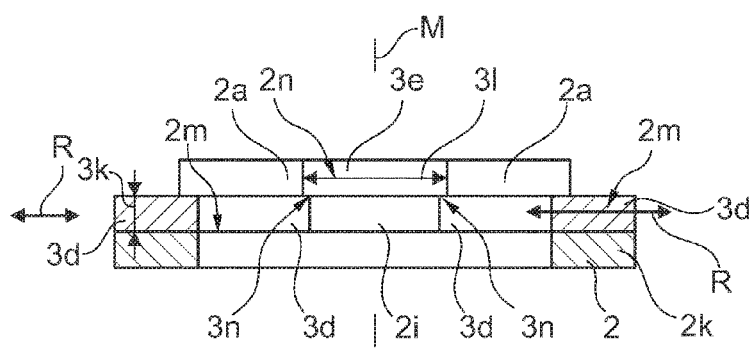
FIG. 17 shows a section through a sixth exemplary embodiment of a sealing ring.

In a further advantageous configuration, at least two sealing segments 3 are arranged in sealing ring 1 in such a manner that sealing segments 3 arranged following consecutively in circumferential direction U are arranged displaced by an offset 2h in the direction of central axis M. FIG. 16 shows in a perspective view and FIG. 17 in a section two exemplary embodiments of such an arrangement. In FIG. 16, base ring 2k forms a guide surface 2m on which both wide sealing segments 3d are mounted displaceably in radial direction R. Holding ring 2 has, between both guide segments 2a, a base part 2i with guide surface 2n, wherein the height of base part 2i corresponds to offset 2h. Narrow sealing segment 3e is mounted displaceably in radial direction R on guide surface 2n so that narrow and wide sealing segments 3e, 3d are arranged displaced by an offset 2h in the direction of central axis M. One particularly advantageous arrangement with offset 2h is represented in FIG. 17. The section according to FIG. 17 shows a base ring 2k with guide surface 2m and a base part 2i with guide surface 2n so that guide surfaces 2m, 2n are arranged spaced apart by an offset 2h in the direction of central axis M. In the represented exemplary embodiment, offset 2h is as wide as axial width 3k of wide sealing segment 3d. Sealing segments 3d, 3e are mounted displaceably in radial direction R. Narrow sealing segment 3e has a width 3l in circumferential direction U which is larger than the width of guide surface 2n which has the result that both sealing segments 3d, 3e have to the left and right a point of intersection 3n at which a part of both sealing segments 3d, 3e are arranged on top of one another in the direction of central axis M. Such a point of intersection 3n has the advantage of improved sealing in axial direction M. In one advantageous configuration, at least two sealing segments 3 arranged following consecutively in circumferential direction U partially overlap one another. Offset 2h is advantageously at least as high as an axial width 3k of sealing segment 3. Offset 2h could, however, also be larger than or smaller than axial width 3k.

Figure 19:
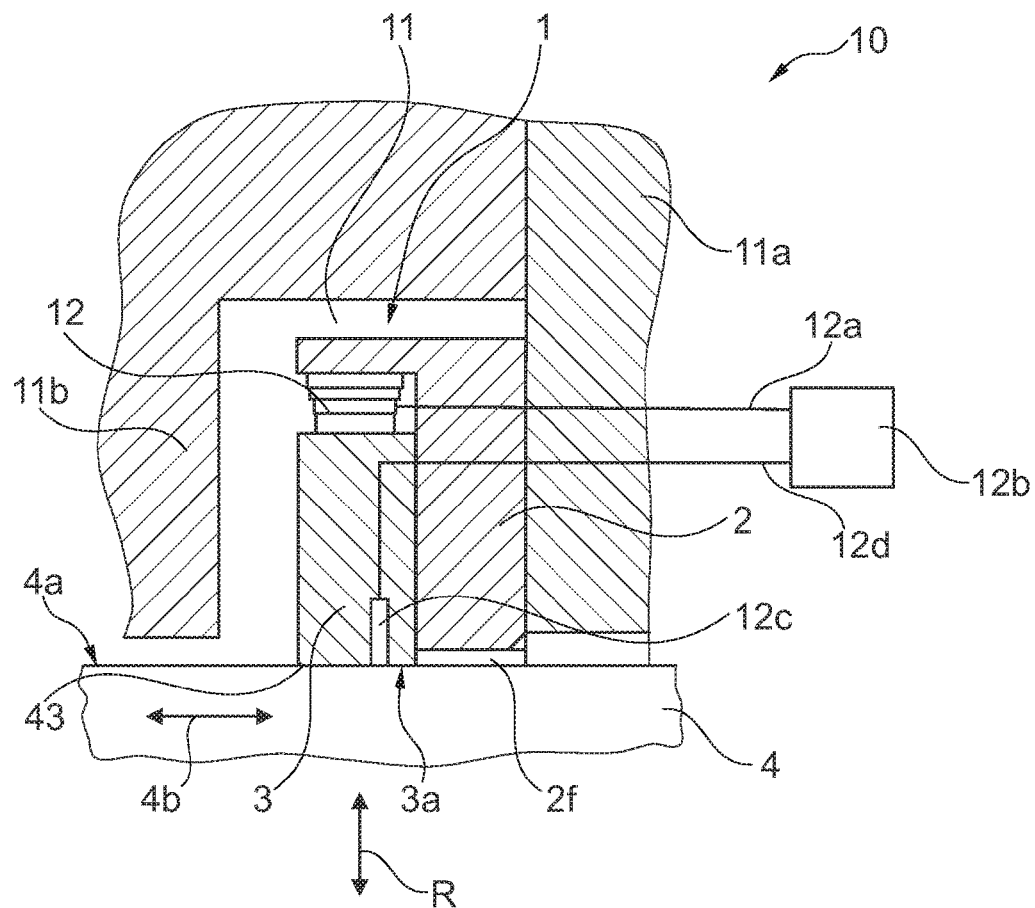
FIG. 19 shows a longitudinal section through a seal arrangement with actively actuable sealing segments.

FIG. 19 shows a longitudinal section through a seal arrangement 10 with actively actuable sealing segments 3. In the represented exemplary embodiment, holding ring 2 is configured to be L-shaped, wherein there is arranged in the radial direction between sealing segment 3 and holding ring 2 a drive means 12, for example a piezoelectric crystal, in order to actuate the position of sealing segments 3 in radial direction R in order as a result to adjust the width of sealing gap 43 formed between face side 3a of sealing segment 3 and surface 4a of piston rod 4. Drive means 12 is connected via electrical lines 12a to an actuation device 12b. In one advantageous configuration, a sensor 12c is furthermore provided which is arranged, for example, in sealing segment 3, wherein sensor 12c is also connected in a signal-conducting manner, for example via a line 12d, to actuation device 12b so that a control circuit is formed which is able to control the distance between sealing surface 3a and surface 4a of piston rod 4. This distance is advantageously controlled such that sealing surface 3a barely touches surface 4a or not at all. In one advantageous configuration, a drive means 12 is provided for each sealing segment 3 of sealing ring 1 so that each sealing segment 3 can preferably also be actuated displaceably individually in radial direction R. In one advantageous configuration, a sensor 12c is also provided for each sealing segment 3 in order to individually actuate width of sealing gap 43 of each sealing segment 3.

Sealing segment 3 according to the invention is advantageously used in a seal arrangement 10 for sealing off a piston rod 4, which runs in axial direction 4b, of a piston compressor. Such a seal arrangement 10 comprises at least one packing chamber 11, wherein packing chamber 11 is delimited in axial direction 4b by a first and a second side wall 11a, 11b, wherein at least one sealing ring 1 is arranged in packing chamber 11. A seal arrangement normally comprises a multiplicity of packing chambers 11 spaced apart in the axial direction in which in each case a sealing ring 1 is arranged. It may prove to be advantageous to also provide a covering ring 5 for each sealing ring 1, which covering ring 5 is arranged in the axial direction directly next to sealing ring 1.

The arrangement represented in FIG. 18 of tip 2g, at a small distance D1 of preferably one to several tenths of a millimeter to inner diameter M1, has the result that the two sealing segments 3 arranged following consecutively in circumferential direction U can contact one another in the region between inner diameter M1 and tip 2g so that sealing segments 3 slightly deform where necessary in the region of the mutual point of contact. This has the result that the sealing segments generate a particularly good sealing action in the region of tip 2g in the axial direction. In a further advantageous embodiment, tip 2g is arranged flush with inner diameter M1, i.e. distance D1 is zero. This configuration also has advantages in that sealing segments 3 could touch one another in radial direction R after tip 2g, i.e. in the region of gap 2f. This mutual contact has the result that gap 2f is sealed off particularly well at this point in axial direction 4b. It is apparent from FIG. 2 that sealing segment 3 can have relatively narrow end edges 3n at this point, which end edges 3n can be deformed elastically or plastically with relatively little force which has the result that the region, which is located directly in front of tip 2g, of gap 2f is sealed off by sealing segment 3 which preferably deforms elastically or plastically in this region. This has the result that gap 2f is sealed off in the region directly in front of tip 2g although tip 2g itself does not have a sealing segment 3 and tip 2g always has a small distance to surface 4a of piston rod 4.

Figure 20:
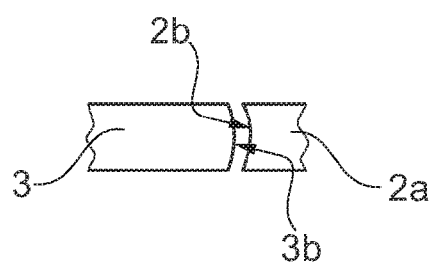
FIG. 20 and FIG. 21 show examples two possible configurations of a mutual guide surface of a guide segment and sealing segment.
Figure 21:
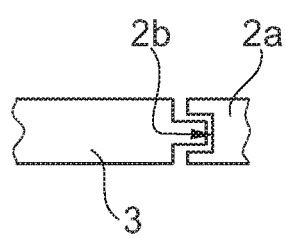

In the represented exemplary embodiments, sealing segment guide surfaces 3b and lateral guide surfaces 2b, 2c are always represented as flat surfaces. These surfaces can, however, be configured in a plurality of possible forms, wherein these forms must be configured such that sealing segment 3 is mounted in holding ring 2 so as to be displaceable in radial direction R. FIGS. 20 and 21 show by way of example two possible configurations of the mutual guide surfaces of guide segment 2a and sealing segment 3. These configurations have the advantage that sealing segment 3 is guided such that only a movement in radial direction R is possible, whereas a movement in the direction of central axis M is ruled out.

The invention claimed is:

1. A sealing ring (1) for sealing off a piston rod (4), comprising an integrally continuous holding ring (2) having a circular inner diameter (MI) and a central axis (M), and comprising a multiplicity of sealing segments (3) which are mounted in holding ring (2) so as to be displaceable in a radial direction relative to the central axis (M), wherein each sealing segment (3) has a sealing surface (3a) which is aligned towards central axis (M) and runs in a curved manner in the circumferential direction (U) to the central axis (M), and wherein each sealing segment (3) has two lateral sealing segment guide surfaces (3b) running mutually parallel, wherein the sealing surface (3a) ends on both sides of the two lateral sealing segment guide surfaces (3b), and wherein the holding ring (2) comprises a multiplicity of guide segments (2a) arranged mutually spaced apart in the circumferential direction (U), wherein in each case two guide segments (2a) following consecutively in the circumferential direction (U) have guide surfaces (2b, 2c) which face one another and run parallel and which are arranged mutually spaced apart and configured in such a manner that the sealing segment (3) is guided via its lateral sealing segment guide surfaces (3b) on the two lateral guide surfaces (2b, 2c) and is mounted displaceably in the radial direction (R), wherein guide segments (2a) and sealing segments (3) are arranged following consecutively in the circumferential direction (U).

2. The sealing ring as claimed in claim 1, characterized in that the guide segments (2a) end in a tip (2g) in the direction of the central axis (M).

3. The sealing ring as claimed in claim 2, characterized in that the tip (2g) runs flush with the inner diameter (M1) in the direction of the central axis (M).

4. The sealing ring as claimed in claim 2, characterized in that the tip (2g) is spaced apart from the inner diameter (M1) in the radial direction (R) by a distance of up to 0.4 mm, preferably of up to 0.2 mm.

5. The sealing ring as claimed in claim 1, characterized in that the lateral guide surfaces (2b, 2c) of each guide segment (2a) run at an angle of a maximum of 90 degrees.

6. The sealing ring as claimed in claim 1, characterized in that said sealing ring comprises an even number at least, however, of four sealing segments (3) and in that said sealing ring comprises the same number of guide segments (2a) which are arranged in the circumferential direction (U) between the sealing segments (3).

7. The sealing ring as claimed in claim 1, characterized in that said sealing ring comprises an odd number at least, however, of five sealing segments (3) and in that said sealing ring comprises the same number of guide segments (2a) which are arranged in the circumferential direction (U) between the sealing segments (3).

8. The sealing ring as claimed in claim 6, characterized in that all the sealing segments (3) have the same width in the circumferential direction (U) and in that all the guide segments (2a) have the same width in the circumferential direction (U).

9. The sealing ring as claimed in claim 6, characterized in that two sealing segments (3) are arranged opposite one another in relation to the central axis (M) have the same width in the circumferential direction (U) and in that sealing segments (3) arranged following consecutively in the circumferential direction (U) have different widths in the circumferential direction (U).

10. The sealing ring as claimed in claim 6, characterized in that sealing segments (3) following consecutively in the circumferential direction (U) are arranged displaced by an offset (2h) in the direction of the central axis (M).

11. The sealing ring as claimed in claim 10, characterized in that the offset (2h) is at least as high as axial width (3k) of the sealing segment (3).

12. The sealing ring as claimed in claim 10, characterized in that at least one of the sealing segments (3) partially covers a sealing segment (3) arranged adjacently in the circumferential direction (U).

13. The sealing ring as claimed in claim 10, characterized in that said sealing ring comprises at least one drive device (12) which is configured and arranged such that it determines the position of at least one sealing segment (3) in the radial direction (R).

14. The sealing ring as claimed in claim 13, characterized in that each sealing segment (3) is assigned a drive device (12) in order to influence the position of each sealing segment (3) individually.

15. A seal arrangement (10) as claimed in claim 1, for sealing off a piston rod (4), running in the axial direction (4b), of a piston compressor, comprising at least one packing chamber (11), wherein the packing chamber (11) is delimited in the axial direction (4b) by a first and a second side wall (11a, 11b), wherein at least one sealing ring (1) is arranged in the packing chamber (11).

* * * * *